United States Patent
Maeda

(10) Patent No.: US 10,985,401 B2
(45) Date of Patent: Apr. 20, 2021

(54) BINDER COMPOSITION FOR SOLID ELECTROLYTE BATTERY AND SLURRY COMPOSITION FOR SOLID ELECTROLYTE BATTERY

(71) Applicant: ZEON CORPORATION, Tokyo (JP)

(72) Inventor: Kouichirou Maeda, Tokyo (JP)

(73) Assignee: ZEON CORPORATION, Chiyoda-ku (JP)

( * ) Notice: Subject to any disclaimer, the term of this patent is extended or adjusted under 35 U.S.C. 154(b) by 49 days.

(21) Appl. No.: 16/303,292

(22) PCT Filed: Jun. 6, 2017

(86) PCT No.: PCT/JP2017/021033
§ 371 (c)(1),
(2) Date: Nov. 20, 2018

(87) PCT Pub. No.: WO2017/213156
PCT Pub. Date: Dec. 14, 2017

(65) Prior Publication Data
US 2019/0214673 A1    Jul. 11, 2019

(30) Foreign Application Priority Data
Jun. 9, 2016 (JP) .............................. JP2016-115242

(51) Int. Cl.
| | |
|---|---|
| *H01M 10/056* | (2010.01) |
| *H01M 10/0562* | (2010.01) |
| *C08K 3/30* | (2006.01) |
| *H01M 4/139* | (2010.01) |
| *H01M 10/0585* | (2010.01) |
| *H01M 4/62* | (2006.01) |
| *C08L 1/08* | (2006.01) |
| *C08L 33/08* | (2006.01) |
| *C08L 1/28* | (2006.01) |
| *C08L 25/14* | (2006.01) |
| *C08L 33/06* | (2006.01) |

(52) U.S. Cl.
CPC .............. *H01M 10/056* (2013.01); *C08K 3/30* (2013.01); *C08L 1/08* (2013.01); *C08L 1/28* (2013.01); *C08L 25/14* (2013.01); *C08L 33/062* (2013.01); *C08L 33/08* (2013.01); *H01M 4/139* (2013.01); *H01M 4/62* (2013.01); *H01M 4/622* (2013.01); *H01M 10/0562* (2013.01); *H01M 10/0585* (2013.01); *C08L 2203/20* (2013.01); *H01M 2300/0082* (2013.01); *H01M 2300/0091* (2013.01)

(58) Field of Classification Search
None
See application file for complete search history.

(56) References Cited

U.S. PATENT DOCUMENTS

| | | | | |
|---|---|---|---|---|
| 6,881,517 B1* | 4/2005 | Kanzaki | ............... | H01M 4/621 429/217 |
| 2014/0231719 A1* | 8/2014 | Cha | ................ | H01M 4/622 252/503 |
| 2014/0370382 A1* | 12/2014 | Lim | ................ | C08L 23/0869 429/217 |
| 2017/0237115 A1* | 8/2017 | Mochizuki | ........ | H01M 4/0404 429/311 |

FOREIGN PATENT DOCUMENTS

| | | |
|---|---|---|
| JP | S59151770 A | 8/1984 |
| JP | 4134617 B2 | 8/2008 |
| JP | 2009176484 A | 8/2009 |
| JP | 2009211950 A | 9/2009 |
| JP | 2011034962 A | 2/2011 |
| JP | 2012243476 A | 12/2012 |
| WO | WO-2015147279 A1 * 10/2015 ............ H01M 4/134 |

OTHER PUBLICATIONS

Dec. 11, 2018, International Preliminary Report on Patentability issued in the International Patent Application No. PCT/JP2017/021033.
Dec. 13, 2019, The Extended European Search Report issued by the European Patent Office in the corresponding European Patent Application No. 17810330.5.

* cited by examiner

*Primary Examiner* — Daniel S Gatewood
(74) *Attorney, Agent, or Firm* — Kenja IP Law PC

(57) ABSTRACT

Provided are a binder composition for a solid electrolyte battery and a slurry composition for a solid electrolyte battery that have excellent processability and can cause a solid electrolyte battery to display excellent battery characteristics. The binder composition contains a particulate polymer of a copolymer including an acrylate monomer unit and an aromatic monomer unit, alkyl-modified cellulose represented by formula (I), and an organic solvent. In formula (I), $R^1$, $R^2$, and $R^3$ each indicate a hydrogen atom or an alkyl group having a carbon number of at least 1 and not more than 4. At least two of $R^1$, $R^2$, and $R^3$ are alkyl groups having a carbon number of at least 2 and not more than 4 in 50 mol % or more of all repeating units. Also, n indicates a natural number.

4 Claims, No Drawings

BINDER COMPOSITION FOR SOLID ELECTROLYTE BATTERY AND SLURRY COMPOSITION FOR SOLID ELECTROLYTE BATTERY

TECHNICAL FIELD

The present disclosure relates to a binder composition for a solid electrolyte battery and a slurry composition for a solid electrolyte battery that can be used in production of a solid electrolyte battery.

BACKGROUND

Demand for batteries such as lithium ion batteries has been increasing in recent years for various applications such as mobile information terminals, mobile electronic devices, and other mobile terminals, and also domestic small power storage devices, electric motorcycles, electric vehicles, and hybrid electric vehicles.

The widespread use of batteries in such applications has been accompanied by demand for further improvement of battery safety. One effective method for ensuring battery safety is to prevent leakage of an organic electrolyte solution containing an electrolyte dissolved in an organic solvent. On the other hand, techniques relating to the production of batteries in which solid electrolytes are used instead of organic electrolyte solutions (i.e., solid electrolyte batteries) have been investigated.

Specifically, a solid electrolyte battery normally includes a solid electrolyte layer as an electrolyte layer between a positive electrode and a negative electrode. The solid electrolyte layer may, for example, be a polymeric solid electrolyte layer or an inorganic solid electrolyte layer. As one example of a polymeric solid electrolyte layer, PTL 1 describes a solid electrolyte layer obtained through shaping of a composition obtained by adding an electrolyte salt to polyethylene oxide or the like. On the other hand, as one example of an inorganic solid electrolyte layer, PTL 2 describes a solid electrolyte layer obtained through press forming of a powder of a specific three-component glassy solid electrolyte. Solid electrolyte batteries including inorganic solid electrolyte layers, in particular, have exceedingly high safety compared to batteries in which organic electrolyte solutions are used. For this reason, the development of inorganic solid electrolyte layer-containing solid electrolyte batteries having high safety has been proceeding, particularly in recent years (for example, refer to PTL 3 to 5).

In PTL 3 to 5, a binder is used in production of a solid electrolyte battery. The binder is used, for example, in a solid electrolyte layer or in an electrode active material layer disposed on a current collector in an electrode with the aim of binding components such as solid electrolyte particles and electrode active material so that these components do not become detached from a battery member such as an electrode.

The binder in the electrode active material layer or solid electrolyte layer is an important element for the expression of characteristics as a battery.

CITATION LIST

Patent Literature

PTL 1: JP 4134617 B
PTL 2: JP S59-151770 A
PTL 3: JP 2009-176484 A
PTL 4: JP 2009-211950 A
PTL 5: JP 2012-243476 A

SUMMARY

Technical Problem

Investigation by the inventor revealed the following problems in production of an electrode active material layer and/or solid electrolyte layer using a binder by the techniques in PTL 3 to 5.

All-solid-state lithium secondary batteries described in PTL 3 and 4 may have inadequate capacity characteristics due to insufficient ion conductivity within a solid electrolyte layer or electrode active material layer.

Moreover, even when the technique in PTL 5 is adopted, a solid electrolyte layer or an electrode including an electrode active material layer may have poor flexibility, and this may result in splitting, chipping, or cracking of the electrode or solid electrolyte layer during production of a solid electrolyte battery (i.e., processability may be poor). Furthermore, a solid electrolyte battery including such an electrode or solid electrolyte layer may have inadequate battery characteristics such as capacity characteristics.

Accordingly, an objective of the present disclosure is to provide a binder composition for a solid electrolyte battery and a slurry composition for a solid electrolyte battery that have excellent processability and can cause a solid electrolyte battery to display excellent battery characteristics.

Solution to Problem

The inventor discovered through diligent investigation that the objective set forth above can be achieved through use of a binder composition that contains a copolymer having a specific chemical composition, a specific cellulosic polymer, and an organic solvent. This discovery led to the present disclosure.

Specifically, the present disclosure provides the following.

(1) A binder composition for a solid electrolyte battery comprising: a particulate polymer of a copolymer including an acrylate monomer unit and an aromatic monomer unit; alkyl-modified cellulose represented by formula (I), shown below,

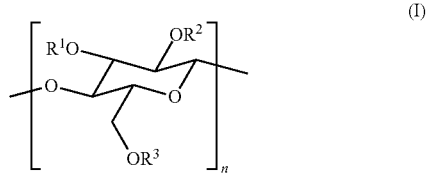

where $R^1$, $R^2$, and $R^3$ each indicate a hydrogen atom or an alkyl group having a carbon number of at least 1 and not more than 4, at least two of $R^1$, $R^2$, and $R^3$ are alkyl groups having a carbon number of at least 2 and not more than 4 in 50 mol % or more of all repeating units, and n indicates a natural number; and an organic solvent.

(2) The binder composition for a solid electrolyte battery according to the foregoing (1), wherein the acrylate monomer unit and the aromatic monomer unit are included in the particulate polymer in a weight ratio of 30:70 to 80:20.

(3) The binder composition for a solid electrolyte battery according to the foregoing (1) or (2), wherein the alkyl-modified cellulose is ethyl cellulose having a degree of substitution of at least 2.2 and not more than 2.7.

(4) The binder composition for a solid electrolyte battery according to any one of the foregoing (1) to (3), wherein the organic solvent has a boiling point of 100° C. or higher.

(5) A slurry composition for a solid electrolyte battery comprising: the binder composition for a solid electrolyte battery according to any one of the foregoing (1) to (4); and solid electrolyte particles.

(6) The slurry composition for a solid electrolyte battery according to the foregoing (5), wherein the solid electrolyte particles are solid electrolyte particles formed from a sulfide.

Advantageous Effect

According to the present disclosure, it is possible to provide a binder composition for a solid electrolyte battery and a slurry composition for a solid electrolyte battery that have excellent processability and can cause a solid electrolyte battery to display excellent battery characteristics.

DETAILED DESCRIPTION

The following provides a detailed description of an embodiment of the present disclosure.

A presently disclosed binder composition for a solid electrolyte battery is used in production of a solid electrolyte battery (for example, in formation of a solid electrolyte layer or an electrode active material layer that is a constituent of an electrode). A presently disclosed slurry composition for a solid electrolyte battery contains at least solid electrolyte particles and the presently disclosed binder composition for a solid electrolyte battery, and is used in formation of a solid electrolyte layer included in a solid electrolyte battery or in formation of an electrode active material layer that is a constituent of an electrode included in a solid electrolyte battery.

(Binder Composition for Solid Electrolyte Battery)

The following describes the presently disclosed binder composition for a solid electrolyte battery. The presently disclosed binder composition for a solid electrolyte battery contains: a particulate polymer of a copolymer including an acrylate monomer unit and an aromatic monomer unit; alkyl-modified cellulose represented by the following formula (I)

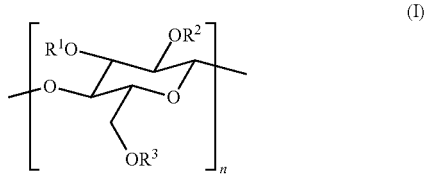

(in formula (I), $R^1$, $R^2$, and $R^3$ each indicate a hydrogen atom or an alkyl group having a carbon number of at least 1 and not more than 4, and at least two of $R^1$, $R^2$, and $R^3$ are alkyl groups having a carbon number of at least 2 and not more than 4 in 50 mol % or more of all repeating units; and n indicates a natural number); and an organic solvent.

<Particulate Polymer>

The particulate polymer used in the present disclosure is a copolymer including at least an acrylate monomer unit and an aromatic monomer unit. The phrase "including a monomer unit" as used in the present disclosure means that "a polymer obtained using that monomer includes a repeating unit derived from the monomer". In other words, the copolymer is obtained through copolymerization of at least an acrylate monomer and an aromatic monomer.

<<Acrylate Monomer>>

Examples of acrylate monomers that may be used include acrylic acid alkyl esters such as methyl acrylate, ethyl acrylate, n-propyl acrylate, isopropyl acrylate, n-butyl acrylate, t-butyl acrylate, 2-ethylhexyl acrylate, and benzyl acrylate; acrylic acid alkoxyalkyl esters such as 2-methoxyethyl acrylate and 2-ethoxyethyl acrylate; acrylic acid 2-(perfluoroalkyl) esters such as 2-(perfluorobutyl)ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, 2-ethylhexyl methacrylate, lauryl methacrylate, tridecyl methacrylate, and stearyl methacrylate; methacrylic acid 2-(perfluoroalkyl) esters such as 2-(perfluorobutyl)ethyl methacrylate and 2-(perfluoropentyl)ethyl methacrylate; benzyl acrylate; and benzyl methacrylate. One of these acrylate monomers may be used individually, or two or more of these acrylate monomers may be used in combination. Of these acrylate monomers, ethyl acrylate, n-butyl acrylate, and 2-ethylhexyl acrylate are preferable in the present disclosure due to high close adherence with solid electrolyte particles.

The percentage content of the acrylate monomer unit in the particulate polymer when the total of all monomer units (excluding structural units derived from a subsequently described crosslinking agent) is taken to be 100 weight % is preferably 30 weight % or more, and more preferably 40 weight % or more, and is preferably 80 weight % or less, and more preferably 75 weight % or less. When the percentage content of the acrylate monomer unit is 30 weight % or more, sufficient flexibility of a solid electrolyte layer or an electrode including an electrode active material layer can be ensured, and processability can be further increased. On the other hand, when the percentage content of the acrylate monomer unit is 80 weight % or less, sufficient rigidity of a solid electrolyte layer or an electrode including an electrode active material layer can be ensured, and battery characteristics of a solid electrolyte battery can be further improved.

<<Aromatic Monomer>>

Examples of aromatic monomers that may be used include styrenic monomers such as styrene, vinyltoluene (methylstyrene), t-butylstyrene, vinylbenzoic acid (4-carboxymethylstyrene), methyl vinylbenzoate, vinylnaphthalene, hydroxymethylstyrene, and α-methylstyrene. One of these aromatic monomers may be used individually, or two or more of these aromatic monomers may be used in combination. Of these aromatic monomers, styrene is preferable.

The percentage content of the aromatic monomer unit in the particulate polymer when the total of all monomer units (excluding structural units derived from the subsequently described crosslinking agent) is taken to be 100 weight % is preferably 20 weight % or more, and more preferably 25 weight % or more, and is preferably 70 weight % or less, and more preferably 60 weight % or less. When the percentage content of the aromatic monomer unit is 20 weight % or more, sufficient rigidity of a solid electrolyte layer or an electrode including an electrode active material layer can be ensured, and battery characteristics of a solid electrolyte battery can be further improved. On the other hand, when the percentage content of the aromatic monomer unit is 70 weight % or less, sufficient flexibility of a solid electrolyte layer or an electrode including an electrode active material layer can be ensured, and processability can be further increased.

The acrylate monomer unit and the aromatic monomer unit are preferably included in the particulate polymer in a weight ratio of 30:70 to 80:20, and more preferably 40:60 to 75:25. When the weight ratio of the acrylate monomer unit and the aromatic monomer unit is within any of the ranges set forth above, processability can be further increased, and battery characteristics of a solid electrolyte battery can be further improved.

<<Other Monomers>>

The particulate polymer may further include monomer units other than the acrylate monomer unit and the aromatic monomer unit (i.e., "other monomer units") to the extent that the effects of the present disclosure are not impaired. Examples of other monomers that may be used to introduce such other monomer units include monomers that are copolymerizable with acrylate monomers and aromatic monomers. Examples of copolymerizable monomers that may be used include unsaturated carboxylic acids such as acrylic acid, methacrylic acid, itaconic acid, and fumaric acid; amide monomers such as acrylamide, methacrylamide, N-methylolacrylamide, and acrylamido-2-methylpropane sulfonic acid; $\alpha,\beta$-unsaturated nitrile compounds such as acrylonitrile and methacrylonitrile; olefins such as ethylene and propylene; diene monomers such as butadiene and isoprene; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; and heterocycle-containing vinyl compounds such as N-vinylpyrrolidone, vinylpyridine, and vinylimidazole. One of these copolymerizable monomers may be used individually, or two or more of these copolymerizable monomers may be used in combination. Of these copolymerizable monomers, amide monomers and $\alpha,\beta$-unsaturated nitrile compounds are preferable from a viewpoint of affinity with organic solvents.

Moreover, of the other monomers listed above, a monomer that can form a self-crosslinking structure such as a diene monomer (for example, butadiene or isoprene) or an $\alpha,\beta$-unsaturated nitrile compound (for example, acrylonitrile) is preferably used, and acrylonitrile is more preferably used from a viewpoint of causing the particulate polymer to adopt a particulate form.

The percentage content of monomer units introduced through the copolymerizable monomers described above (other monomer units) in the particulate polymer when the total of all monomer units (excluding structural units derived from the subsequently described crosslinking agent) is taken to be 100 weight % is preferably 40 weight % or less, more preferably 30 weight % or less, and even more preferably 20 weight % or less.

<<Crosslinking Agent>>

A compound that can typically function as a crosslinking agent may be used in polymerization of the particulate polymer in order to cause the particulate polymer to adopt a particulate form.

Examples of compounds (crosslinking agents) that can function as crosslinking agents include compounds having two or more double bonds (particularly ethylenic double bonds). However, note that compounds described above as "monomers" are excluded. Specific examples include polyfunctional acrylate compounds such as ethylene glycol dimethacrylate, diethylene glycol dimethacrylate, trimethylolpropane triacrylate, polyethylene glycol diacrylate, polypropylene glycol diacrylate, trimethylolpropane trimethacrylate, and pentaerythritol tetraacrylate; and polyfunctional aromatic compounds such as divinylbenzene. One of these compounds may be used individually, or two or more of these compounds may be used in combination. Of these compounds, polyfunctional acrylate compounds such as ethylene glycol dimethacrylate are preferable.

The amount of the crosslinking agent that is suitable varies depending on the type of crosslinking agent that is used, but is preferably at least 0.01 parts by weight and not more than 5 parts by weight, and more preferably at least 0.05 parts by weight and not more than 1 part by weight per 100 parts by weight, in total, of monomers (excluding the crosslinking agent).

<<Production of Particulate Polymer>>

The production method of the particulate polymer used in the present disclosure may be any method of polymerization in a dispersion such as suspension polymerization, bulk polymerization, or emulsion polymerization. The polymerization method may be ionic polymerization, radical polymerization, living radical polymerization, or the like.

Of these methods, emulsion polymerization is preferable for reasons such as that the particulate polymer can be obtained in a dispersed state in an aqueous solvent. The aqueous solvent is a solvent that includes water, and is preferably water from a viewpoint that water is non-flammable and a dispersion liquid of the particulate polymer is easily obtained therewith.

Note that water may be used as the principal solvent and an aqueous solvent other than water may be mixed therewith to the extent that the effects of the present disclosure are not lost and the dispersed state of the particulate polymer can be ensured. Examples of aqueous solvents other than water that may be used include ketones, alcohols, glycols, glycol ethers, and ethers.

The emulsion polymerization can be carried out in accordance with a standard method. Moreover, commonly used polymerization auxiliary materials such as emulsifiers, polymerization initiators, molecular weight modifiers, and chain transfer agents may be used in the emulsion polymerization.

Any emulsifier may be used so long as the desired polymer can be obtained and examples thereof include anionic surfactants, nonionic surfactants, cationic surfactants, and amphoteric surfactants. Of these emulsifiers, an anionic surfactant such as an alkyl benzene sulfonic acid salt, an aliphatic sulfonic acid salt, a higher alcohol sulfuric acid ester salt, an $\alpha$-olefin sulfonic acid salt, or an alkyl ether sulfuric acid ester salt can be preferably used.

Although any amount of emulsifier can be used so long as the desired particulate polymer can be obtained, the amount per 100 parts by weight, in total, of monomers (excluding the crosslinking agent) is preferably 0.5 parts by weight or more, and more preferably 1 part by weight or more, and is preferably 10 parts by weight or less, and more preferably 5 parts by weight or less.

Examples of polymerization initiators that may be used in polymerization include organic peroxides such as lauroyl peroxide, diisopropyl peroxydicarbonate, di-2-ethylhexyl peroxydicarbonate, t-butyl peroxypivalate, and 3,3,5-trimethylhexanoyl peroxide; azo compounds such as $\alpha,\alpha'$-azobisisobutyronitrile; ammonium persulfate; and potassium persulfate.

Note that seed particles may be used in the polymerization to perform seeded polymerization. The polymerization conditions may be freely selected depending on the polymerization method, the type of polymerization initiator, and so forth. Moreover, the percentage content of each monomer in a monomer composition used in production of the particulate polymer can be set in accordance with the percentage content of each monomer unit (repeating unit) in the particulate polymer.

<<Solvent Exchange>>

It is preferable that solvent exchange with an organic solvent is performed with respect to solvent in a particulate polymer-containing aqueous dispersion obtained as set forth above. The aqueous dispersion contains a particulate polymer including an acrylate monomer unit and an aromatic monomer unit that is obtained as set forth above. The solvent of the aqueous dispersion is an aqueous solvent such as water.

This solvent exchange can be performed by a commonly known method. For example, the aqueous dispersion and an organic solvent may be loaded into a rotary evaporator, and an operation of solvent exchange and dehydration may be performed under reduced pressure at a specific temperature.

It is preferable that an organic solvent such as subsequently described for the organic solvent used in the present disclosure is used in solvent exchange.

The solid content concentration of the binder composition for a solid electrolyte battery used in the present disclosure is preferably at least 1 weight % and not more than 30 weight %. Moreover, the water content in the particulate polymer-containing organic solvent after solvent exchange is preferably less than 1,000 ppm, more preferably less than 500 ppm, and even more preferably less than 100 ppm.

<Organic Solvent>

The organic solvent used in the present disclosure is preferably an organic solvent having a boiling point of 100° C. or higher. The organic solvent having a boiling point of 100° C. or higher is preferably an aromatic hydrocarbon such as toluene or xylene; an ether such as cyclopentyl methyl ether; or an ester such as butyl acetate, and is more preferably xylene. One of these solvents may be used individually, or two or more of these solvents may be used as a mixture.

Note that the term "boiling point" as used in the present disclosure refers to the boiling point at normal pressure.

<Alkyl-Modified Cellulose>

The alkyl-modified cellulose used in the present disclosure is represented by the following formula (I).

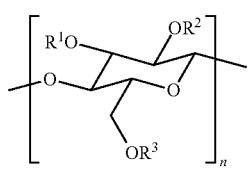

(I)

(In formula (I), $R^1$, $R^2$, and $R^3$ each indicate a hydrogen atom or an alkyl group having a carbon number of at least 1 and not more than 4, and at least two of $R^1$, $R^2$, and $R^3$ are alkyl groups having a carbon number of at least 2 and not more than 4 in 50 mol % or more of all repeating units; and n indicates a natural number.)

Note that in formula (I), $R^1$, $R^2$, and $R^3$ may differ from one another, or two or more of $R^1$, $R^2$, and $R^3$ may be the same.

Although no specific limitations are placed on the value of the natural number (positive integer) n in formula (I), n is normally within the range that may be adopted by typical cellulose and is, for example, at least 1,000 and not more than 1,000,000.

Note that the n repeating units constituting the alkyl-modified cellulose used in the present disclosure may have different structures or may all have the same structure.

The structural features of the alkyl-modified cellulose described above can be determined by known analytical means (for example, nuclear magnetic resonance (NMR) spectroscopy).

Specific examples of alkyl-modified celluloses such as described above include ethyl cellulose, propyl cellulose, ethyl propyl cellulose, butyl cellulose, and ethyl methyl cellulose. One of these alkyl-modified celluloses may be used individually, or two or more of these alkyl-modified celluloses may be used in combination.

Of these alkyl-modified celluloses, ethyl cellulose is preferable, and ethyl cellulose having a degree of substitution of at least 2.2 and not more than 2.7 is more preferable. The term "degree of substitution" has the same meaning as commonly used for the degree of substitution of cellulose and indicates the proportion of $R^1$, $R^2$, and $R^3$ that are etherified. The degree of substitution is 0 in a case in which $R^1$, $R^2$, and $R^3$ are not etherified and is 3 in a case in which every $R^1$, $R^2$, and $R^3$ is etherified.

Note that the "degree of substitution" referred to in the present disclosure can be measured, for example, by a method described in JP 2011-34962 A.

Through a degree of substitution of at least 2.2 and not more than 2.7 in a situation in which ethyl cellulose is used, it is possible to inhibit a phenomenon of the ethyl cellulose not dissolving in the organic solvent due to the degree of substitution thereof being too low and also inhibit a phenomenon of stricter reaction conditions being required and the ethyl cellulose being unsuitable for industrial production due to the degree of substitution thereof being too high.

<Production of Binder Composition for Solid Electrolyte Battery>

The presently disclosed binder composition for a solid electrolyte battery contains the particulate polymer, the alkyl-modified cellulose represented by formula (I), and the organic solvent set forth above. The binder composition for a solid electrolyte battery can be obtained by, for example, performing solvent exchange of solvent in a water dispersion of the particulate polymer with the organic solvent, and subsequently dissolving the alkyl-modified cellulose in the organic solvent containing the particulate polymer.

The amount of the alkyl-modified cellulose represented by formula (I) in the presently disclosed binder composition for a solid electrolyte battery per 100 parts by weight of the particulate polymer is preferably at least 10 parts by weight and not more than 1,000 parts by weight, and more preferably at least 70 parts by weight and not more than 500 parts by weight. When the amount of the alkyl-modified cellulose represented by formula (I) is within any of the ranges set forth above, it is possible to inhibit a phenomenon of a solid electrolyte layer or electrode active material layer becoming hard, and splitting, chipping, or cracking occurring due to the amount of the alkyl-modified cellulose being too large. It is also possible to inhibit a phenomenon of binding capacity of the binder composition for a solid electrolyte battery being insufficient due to the amount of the alkyl-modified cellulose being too small.

(Solid Electrolyte Battery)

A solid electrolyte battery can be produced using the presently disclosed binder composition for a solid electrolyte battery set forth above. Specifically, in production of a solid electrolyte battery including a positive electrode that includes a positive electrode active material layer, a negative electrode that includes a negative electrode active material layer, and a solid electrolyte layer between the positive and negative electrode active material layers, the presently disclosed slurry composition for a solid electrolyte battery containing solid electrolyte particles and the presently disclosed binder composition for a solid electrolyte battery can be used to form at least one of the positive electrode active material layer, the negative electrode active material layer, and the solid electrolyte layer, and preferably to form all of these layers.

Note that the negative electrode active material layer is formed by using a slurry composition for a negative electrode active material layer as a slurry composition for a solid electrolyte battery, the positive electrode active material layer is formed by using a slurry composition for a positive electrode active material layer as a slurry composition for a solid electrolyte battery, and the solid electrolyte layer is formed by using a slurry composition for a solid electrolyte layer as a slurry composition for a solid electrolyte battery.

The following describes the solid electrolyte layer, the positive electrode active material layer, and the negative electrode active material layer.

<Solid Electrolyte Layer>

The solid electrolyte layer is formed by, for example, applying a slurry composition for a solid electrolyte layer containing solid electrolyte particles and a binder composition for a solid electrolyte battery onto the subsequently described positive electrode active material layer or negative electrode active material layer, and then drying the slurry composition.

<<Solid Electrolyte Particles>>

The solid electrolyte particles are normally in a particulate form as a result of having undergone pulverization, and have an indeterminate shape rather than a completely spherical shape. The size of fine particles is normally measured by a method in which the particles are irradiated with laser light and then scattered light is measured, for example. In this situation, the particle diameter is a value that presumes that the shape of a single particle is spherical. When multiple particles are measured together, the proportion of particles having a certain particle diameter can be expressed as a particle size distribution. Solid electrolyte particles forming a solid electrolyte layer are commonly indicated by a value measured by this method as an average particle diameter.

The average particle diameter of the solid electrolyte particles is preferably at least 0.3 μm and not more than 1.3 μm from a viewpoint that a slurry composition for a solid electrolyte layer having good dispersibility and coatability can be obtained. Note that the average particle diameter of the solid electrolyte particles is the number average particle diameter, which can be determined through measurement of a particle size distribution by laser diffraction.

No specific limitations are placed on the solid electrolyte particles other than being particles that are conductive with respect to a charge carrier (for example, a lithium ion). In a case in which the solid electrolyte battery in which the presently disclosed binder composition for a solid electrolyte battery is to be used is an all-solid-state lithium secondary battery, for example, the solid electrolyte particles preferably include a crystalline inorganic lithium ion conductor or an amorphous inorganic lithium ion conductor. One type of solid electrolyte particles may be used individually, or two or more types of solid electrolyte particles may be used in combination.

Examples of crystalline inorganic lithium ion conductors include $Li_3N$, LISICON ($Li_{14}Zn(GeO_4)_4$), perovskite-type $Li_{0.5}La_{0.5}TiO_3$, LIPON ($Li_{3+y}PO_{4-x}N_x$), and Thio-LISICON ($Li_{3.25}Ge_{0.25}P_{0.75}S_4$).

No specific limitations are placed on the amorphous inorganic lithium ion conductor so long as it contains S (sulfur atom) and exhibits ion conductivity (sulfide solid electrolyte material (i.e., solid electrolyte particles composed of a sulfide)). In a case in which the solid electrolyte battery in which the presently disclosed binder composition for a solid electrolyte battery is to be used is an all-solid-state lithium secondary battery, a material obtained using a raw material composition containing $Li_2S$ and a sulfide of an element belonging to any of groups 13 to 15 may be used as the sulfide solid electrolyte material. The method by which the sulfide solid electrolyte material is synthesized using such a raw material composition may be an amorphization method, for example. Examples of amorphization methods that may be used include mechanical milling and melt quenching, of which, mechanical milling is preferable. This is because mechanical milling enables processing at normal temperature and simplification of the production process.

The element belonging to any of groups 13 to 15 may be Al, Si, Ge, P, As, Sb, or the like. Specific examples of sulfides of elements belonging to groups 13 to 15 include $Al_2S_3$, $SiS_2$, $GeS_2$, $P_2S_3$, $P_2S_5$, $As_2S_3$, and $Sb_2S_3$. Of these sulfides, the use of a sulfide of an element belonging to group 14 or 15 is preferable. In particular, the sulfide solid electrolyte material obtained using a raw material composition containing $Li_2S$ and a sulfide of an element belonging to any of groups 13 to 15 is preferably a $Li_2S$—$P_2S_5$ material, a $Li_2S$—$SiS_2$ material, a $Li_2S$—$GeS_2$ material, or a $Li_2S$—$Al_2S_3$ material, and is more preferably a $Li_2S$—$P_2S_5$ material. This is because these materials have excellent Li ion conductivity.

Moreover, the sulfide solid electrolyte material preferably includes bridging sulfur. The inclusion of bridging sulfur increases ion conductivity. When a sulfide solid electrolyte material includes bridging sulfur, reactivity with a positive electrode active material is normally high, and a high-resistance layer is more readily formed. However, as a result of a binder composition containing a copolymer including an acrylate monomer unit and an aromatic monomer unit being used in the present disclosure, an effect of the present disclosure with regard to inhibiting high-resistance layer formation can be sufficiently displayed. The inclusion of bridging sulfur can be judged by considering, for example, measurement results of a Raman spectrum, the chemical composition ratio of raw material, measurement results of NMR, and the like.

The molar ratio of $Li_2S$ in a $Li_2S$—$P_2S_5$ material or a $Li_2S$—$Al_2S_3$ material is, for example, within a range of 50% to 74%, and preferably within a range of 60% to 74% from a viewpoint of more reliably obtaining a sulfide solid electrolyte material including bridging sulfur.

Moreover, the sulfide solid electrolyte material may be sulfide glass, or may be crystallized sulfide glass obtained through heat treatment of this sulfide glass. The sulfide glass can be obtained, for example, by the previously described amorphization methods. The crystallized sulfide glass can be obtained, for example, by subjecting sulfide glass to heat treatment.

In particular, the sulfide solid electrolyte material is preferably crystallized sulfide glass represented by $Li_7P_3S_{11}$. This is because this crystallized sulfide glass has particularly good Li ion conductivity. $Li_7P_3S_{11}$ can be synthesized by, for example, mixing $Li_2S$ and $P_2S_5$ in a molar ratio of 70:30, performing amorphization using a ball mill to synthesize sulfide glass, and subjecting the obtained sulfide glass to heat treatment at a temperature of at least 150° C. and not higher than 360° C. to synthesize the $Li_7P_3S_{11}$.

<<Binder Composition for Solid Electrolyte Layer>>

The binder composition for a solid electrolyte layer contained in the slurry composition for a solid electrolyte layer is used in order to bind the solid electrolyte particles and form a solid electrolyte layer. It is preferable that the presently disclosed binder composition for a solid electrolyte battery set forth above is used as the binder composition for a solid electrolyte layer.

<Positive Electrode Active Material Layer>

The positive electrode active material layer is formed by, for example, applying a slurry composition for a positive electrode active material layer containing a positive electrode active material, solid electrolyte particles, and a binder composition for a positive electrode onto the surface of a subsequently described current collector, and then drying the slurry composition. The slurry composition for a positive electrode active material layer is produced by, for example, mixing the positive electrode active material, the solid electrolyte particles, the binder composition for a positive electrode, and other components added as necessary in the presence of an organic solvent.

<<Positive Electrode Active Material>>

The positive electrode active material is, for example, a compound that can store and release lithium ions in the case of an all-solid-state lithium secondary battery. Positive electrode active materials are broadly categorized as positive electrode active materials composed of inorganic compounds and positive electrode active materials composed of organic compounds.

Examples of positive electrode active materials composed of inorganic compounds include transition metal oxides, composite oxides of lithium and transition metals, and transition metal sulfides. The transition metal may be Fe, Co, Ni, Mn, or the like. Specific examples of inorganic compounds that may be used in the positive electrode active material include lithium-containing composite metal oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

Examples of positive electrode active materials composed of organic compounds include polyaniline, polypyrrole, polyacenes, disulfide compounds, polysulfide compounds, and N-fluoropyridinium salts. One positive electrode active material may be used individually, or two or more positive electrode active materials may be used in combination. For example, a mixture of an inorganic compound such as described above and an organic compound such as described above may be used.

The average particle diameter of the positive electrode active material used in the present disclosure is normally at least 0.1 μm and not more than 50 μm, and preferably at least 1 μm and not more than 20 μm from a viewpoint of improving battery characteristics such as load characteristics and charge/discharge cycle characteristics, and from a viewpoint that a solid electrolyte secondary battery having high charge/discharge capacity can be obtained, and handling of the slurry composition for a positive electrode active material layer and handling during positive electrode production are easy. The average particle diameter can be determined through measurement of a particle size distribution by laser diffraction.

<<Solid Electrolyte Particles>>

The solid electrolyte particles may be any of the examples previously described in the "solid electrolyte layer" section.

The weight ratio of the positive electrode active material and the solid electrolyte particles (positive electrode active material: solid electrolyte particles) is preferably 90:10 to 30:70, and more preferably 80:20 to 40:60. When the weight ratio of the positive electrode active material and the solid electrolyte particles is within any of the ranges set forth above, it is possible to inhibit a phenomenon of battery capacity decreasing as a result of the weight of positive electrode active material in the battery decreasing due to the weight ratio of the positive electrode active material being too small. Moreover, it is possible to inhibit a phenomenon of battery capacity decreasing as a result of electrical conductivity being insufficient and the positive electrode active material not being effectively used due to the weight ratio of the solid electrolyte particles being too small.

<<Binder Composition for Positive Electrode>>

The binder composition for a positive electrode contained in the slurry composition for a positive electrode active material layer is used to bind the positive electrode active material and the solid electrolyte particles and form a positive electrode active material layer. It is preferable that the presently disclosed binder composition for a solid electrolyte battery set forth above is used as the binder composition for a positive electrode.

No specific limitations are placed on the content of the binder composition for a positive electrode in the slurry composition for a positive electrode active material layer. However, from a viewpoint of preventing detachment of the positive electrode active material from the positive electrode without impairing battery reactions, the slurry composition for a positive electrode active material layer preferably contains the binder composition for a positive electrode in an amount of at least 0.1 parts by weight and not more than 5 parts by weight, and more preferably at least 0.2 parts by weight and not more than 4 parts by weight in terms of solid content of the binder (the particulate polymer (copolymer) in the case of the presently disclosed binder composition for a solid electrolyte battery) per 100 parts by weight of the positive electrode active material.

<<Organic Solvent>>

Content of the organic solvent in the slurry composition for a positive electrode active material layer is preferably at least 20 parts by weight and not more than 80 parts by weight, and more preferably at least 30 parts by weight and not more than 70 parts by weight per 100 parts by weight of the positive electrode active material from a viewpoint that good coating characteristics can be obtained while maintaining dispersibility of the solid electrolyte particles. The organic solvent in the slurry composition for a positive electrode active material layer may be composed of only organic solvent that was contained in the binder composition for a positive electrode. Alternatively, organic solvent may be separately added as necessary in production of the slurry composition for a positive electrode active material layer.

<<Other Components>>

Examples of components other than those described above that may be added to the slurry composition for a positive electrode active material layer as necessary include additives exhibiting various functions such as conductive agents and reinforcing materials. No specific limitations are placed on these other components so long as they do not influence battery reactions.

[Conductive Agent]

The conductive agent may be any material that can impart electrical conductivity and typical examples thereof include carbon powder such as acetylene black, carbon black, and graphite, and fibers and foils of various metals. One of these conductive agents may be used individually, or two or more of these conductive agents may be used in combination.

[Reinforcing Material]

Various inorganic fillers and organic fillers having a spherical, plate-like, rod-like, or fibrous form can be used as reinforcing materials. One of these reinforcing materials may be used individually, or two or more of these reinforcing materials may be used in combination.

<Negative Electrode Active Material Layer>

The negative electrode active material layer is a layer containing at least a negative electrode active material.

<<Negative Electrode Active Material>>

Examples of negative electrode active materials that may be used include carbon allotropes such as graphite and coke. A negative electrode active material composed of a carbon allotrope may be used in a mixed or coated form with a metal, a metal salt, an oxide, or the like. Other examples of negative electrode active materials that may be used include oxides of silicon, tin, zinc, manganese, iron, nickel, and the like, sulfuric acid salts, lithium metal, lithium alloys such as Li—Al, Li—Bi—Cd, and Li—Sn—Cd, lithium transition metal nitrides, and silicon. In the case of a metal material, the metal material may be used as an electrode in the form of a metal foil or metal plate, or may be used in a particulate form.

In a situation in which the negative electrode active material is in a particulate form, the negative electrode active material layer is formed by, for example, applying a slurry composition for a negative electrode active material layer containing the negative electrode active material, solid electrolyte particles, and a binder composition for a negative electrode onto the surface of a subsequently described current collector, and then drying the slurry composition. The slurry composition for a negative electrode active material layer is produced by, for example, mixing the negative electrode active material, the solid electrolyte particles, the binder composition for a negative electrode, and other components added as necessary in the presence of an organic solvent.

In the case of a particulate negative electrode active material, the average particle diameter of the negative electrode active material is normally at least 1 μm and not more than 50 μm, and preferably at least 15 μm and not more than 30 μm from a viewpoint of improving battery characteristics such as initial efficiency, load characteristics, and charge/discharge cycle characteristics. The average particle diameter can be determined through measurement of a particle size distribution by laser diffraction.

<<Solid Electrolyte Particles>>

The solid electrolyte particles may be any of the examples previously described in the "solid electrolyte layer" section.

The weight ratio of the negative electrode active material and the solid electrolyte particles (negative electrode active material: solid electrolyte particles) is preferably 90:10 to 50:50, and more preferably 60:40 to 80:20. When the weight ratio of the negative electrode active material and the solid electrolyte particles is within any of the ranges set forth above, it is possible to inhibit a phenomenon of battery capacity decreasing as a result of the weight of negative electrode active material in a battery decreasing due to the weight ratio of the negative electrode active material being too small. Moreover, it is possible to inhibit a phenomenon of battery capacity decreasing as a result of electrical conductivity being insufficient and the negative electrode active material not being effectively used due to the weight ratio of the solid electrolyte particles being too small.

<<Binder Composition for Negative Electrode>>

The binder composition for a negative electrode contained in the slurry composition for a negative electrode active material layer is used to bind the negative electrode active material and the solid electrolyte particles and form a negative electrode active material layer. It is preferable that the presently disclosed binder composition for a solid electrolyte battery set forth above is used as the binder composition for a negative electrode.

No specific limitations are placed on the content of the binder composition for a negative electrode in the slurry composition for a negative electrode active material layer in a situation in which the negative electrode active material is in a particulate form. However, from a viewpoint of preventing detachment of the negative electrode active material from the negative electrode without impairing battery reactions, the slurry composition for a negative electrode active material layer preferably contains the binder composition for a negative electrode in an amount of at least 0.1 parts by weight and not more than 5 parts by weight, and more preferably at least 0.2 parts by weight and not more than 4 parts by weight in terms of solid content of the binder (the particulate polymer (copolymer) in the case of the presently disclosed binder composition for a solid electrolyte battery) per 100 parts by weight of the negative electrode active material.

<<Organic Solvent and Other Components>>

The organic solvent in the slurry composition for a negative electrode active material layer may be composed of only organic solvent that was contained in the binder composition for a negative electrode. Alternatively, organic solvent may be separately added as necessary in production of the slurry composition for a negative electrode active material layer.

Examples of other components that may be added to the slurry composition for a negative electrode active material layer as necessary include the same other components as previously described in the "positive electrode active material layer" section.

<Current Collector>

The current collector used in formation of the positive electrode active material layer or negative electrode active material layer may be any material that has electrical conductivity and electrochemical durability. However, the current collector is preferably a metal material such as iron, copper, aluminum, nickel, stainless steel, titanium, tantalum, gold, or platinum from a viewpoint of having heat resistance. Of these metal materials, aluminum is particularly preferable for a positive electrode and copper is particularly preferable for a negative electrode.

Although no specific limitations are placed on the shape of the current collector, the current collector is preferably a sheet-shaped current collector having a thickness of approximately 0.001 mm to 0.5 mm.

The current collector is preferably subjected to surface roughening treatment before use in order to increase adhesion strength with the positive electrode active material layer or negative electrode active material layer set forth above. The method of surface roughening may, for example, be a mechanical polishing method, an electrolytic polishing method, or a chemical polishing method. The mechanical polishing is performed, for example, using a coated abrasive in which abrasive grains are bonded to cloth or paper, a whetstone, an emery wheel, or a wire brush including steel wire or the like. An intermediate layer may be formed on the surface of the current collector in order to increase electrical conductivity or adhesion strength of the current collector with the positive electrode active material layer or negative electrode active material layer.

<Production of Slurry Composition for Solid Electrolyte Layer>

The slurry composition for a solid electrolyte layer is obtained by, for example, mixing the above-described solid electrolyte particles, binder composition for a solid electrolyte layer, and other components that are added as necessary in the presence of the organic solvent.

<Production of Slurry Composition for Positive Electrode Active Material Layer>

The slurry composition for a positive electrode active material layer is obtained by, for example, mixing the above-described positive electrode active material, solid electrolyte particles, binder composition for a positive electrode, and other components that are added as necessary in the presence of the organic solvent.

<Production of Slurry Composition for Negative Electrode Active Material Layer>

The slurry composition for a negative electrode active material layer is obtained by, for example, mixing the above-described negative electrode active material, solid electrolyte particles, binder composition for a negative electrode, and other components that are added as necessary in the presence of the organic solvent.

No specific limitations are placed on the method by which each of the above-described slurry compositions (slurry composition for solid electrolyte layer, slurry composition for positive electrode active material layer, and slurry composition for negative electrode active material layer) is mixed. For example, a method using a mixing apparatus such as a stirring-type apparatus, a shaking-type apparatus, or a rotary-type apparatus may be adopted. Moreover, examples include a method in which a dispersing and kneading apparatus such as a homogenizer, a ball mill, a bead mill, a planetary mixer, a sand mill, a roll mill, or a planetary kneader is used, and a method in which a planetary mixer, a ball mill, or a bead mill is used is preferable from a viewpoint that this method can inhibit aggregation of the solid electrolyte particles.

<Production of Solid Electrolyte Battery>

The positive electrode of the solid electrolyte battery is obtained by forming a positive electrode active material layer on a current collector. The positive electrode active material layer is formed by, for example, applying the above-described slurry composition for a positive electrode active material layer onto a current collector, and then drying the slurry composition.

In a case in which a metal foil or a metal plate is used as a negative electrode active material, the metal foil or metal plate may be used as the negative electrode of the solid electrolyte battery in this form. On the other hand, in a case in which the negative electrode active material is in a particulate form, the negative electrode is obtained by forming a negative electrode active material layer on a separate current collector to the current collector of the positive electrode. The negative electrode active material layer is formed by applying the above-described slurry composition for a negative electrode active material layer onto a separate current collector to the current collector of the positive electrode, and then drying the slurry composition.

Next, a solid electrolyte layer is formed by, for example, applying the slurry composition for a solid electrolyte layer onto the positive electrode active material layer or negative electrode active material layer that has been formed, and then drying the slurry composition. The electrode on which the solid electrolyte layer is not formed and the electrode on which the solid electrolyte layer is formed are then laminated to produce a solid electrolyte battery device.

No specific limitations are placed on the method by which the slurry composition for a positive electrode active material layer and the slurry composition for a negative electrode active material layer are each applied onto a current collector, and this application may be carried out by, for example, doctor blading, dip coating, reverse roll coating, direct roll coating, gravure coating, extrusion coating, brush coating, or the like. Although no specific limitations are placed on the amount of slurry composition that is applied, the amount is normally set such that the thickness of the active material layer formed after removal of organic solvent is at least 5 µm and not more than 300 µm, and preferably at least 10 µm and not more than 250 µm. The drying method is not specifically limited and examples of drying methods that may be used include drying by warm, hot, or low-humidity air, drying in a vacuum, and drying through irradiation with (far) infrared radiation, an electron beam, or the like. The drying conditions are normally adjusted such that the organic solvent is volatilized as quickly as possible within a rate range for which cracks do not form in the electrode active material layer due to stress concentration and for which peeling of the electrode active material layer from the current collector does not occur. Moreover, an electrode obtained after drying may be pressed in order to stabilize the electrode. Examples of pressing methods that may be used include mold pressing and calender pressing, but these examples are not limiting.

The drying temperature is set as a temperature at which sufficient volatilization of the organic solvent occurs. Specifically, the drying temperature is preferably at least 50° C. and not higher than 250° C., and more preferably at least 80° C. and not higher than 200° C. from a viewpoint that a good active material layer can be formed without thermal decomposition of the binder for a positive electrode or the binder for a negative electrode. The drying time is normally at least 10 minutes and not more than 60 minutes but is not specifically limited to this range.

No specific limitations are placed on the method by which the slurry composition for a solid electrolyte layer is applied onto the positive electrode active material layer or the negative electrode active material layer. Although the slurry composition for a solid electrolyte layer may be applied by any of the methods by which the slurry composition for a positive electrode active material layer and the slurry composition for a negative electrode active material layer can be applied onto a current collector, it is preferable that application is performed by gravure coating because this enables formation of a solid electrolyte layer as a thin film. Although no specific limitations are placed on the amount of slurry composition that is applied, the amount is normally set such that the thickness of the solid electrolyte layer formed after removal of organic solvent is at least 2 µm and not more than 20 µm, and preferably at least 3 µm and not more than 15 µm. The drying method, drying conditions, and drying temperature may be the same as those of the slurry composition for a positive electrode active material layer and the slurry composition for a negative electrode active material layer.

Moreover, a laminate obtained by laminating the electrode on which the solid electrolyte layer is formed and the electrode on which the solid electrolyte layer is not formed may be subjected to pressing. The method of pressing is not specifically limited and may be flat plate pressing, roll pressing, cold isostatic pressing (CIP), or the like. The pressing pressure is preferably at least 5 MPa and not more than 700 MPa, and more preferably at least 7 MPa and not more than 500 MPa from a viewpoint of lowering resistance at each interface between the electrodes and the solid electrolyte layer, lowering contact resistance between particles in each of the layers, and achieving good battery characteristics.

Although no specific limitations are placed on whether the slurry composition for a solid electrolyte layer is applied onto the positive electrode active material layer or the negative electrode active material layer, it is preferable that the slurry composition for a solid electrolyte layer is applied onto whichever of the active material layers has a larger particle diameter electrode active material used therein. This is because depressions and protrusions are formed at the surface of an active material layer when an electrode active material having a large particle diameter is used therein, and these depressions and protrusions at the active material layer surface can be smoothed through application of the slurry composition. As a result, the contact area between the solid electrolyte layer and the electrodes is increased when the electrode on which the solid electrolyte layer is formed and the electrode on which the solid electrolyte layer is not formed are laminated, and this suppresses interface resistance.

The obtained solid electrolyte battery device is placed in a battery container either as obtained or after rolling, folding, or the like in accordance with the battery shape. The battery container is subsequently sealed to obtain a solid electrolyte battery. Moreover, an expanded metal, an overcurrent preventing device such as a fuse or a PTC device, a lead plate, or the like may be placed in the battery container in order to prevent pressure increase inside the battery and the occurrence of overcharging or overdischarging. The battery shape may be a coin type, a button type, a sheet type, a cylinder type, a prismatic type, a flat type, or the like.

EXAMPLES

The following describes the present disclosure through examples. However, the present disclosure is not in any way limited by these examples. Various characteristics were evaluated by the following methods. Note that "parts" and "%" in the examples refer to "parts by weight" and "weight %", respectively, unless otherwise specified.

<Flexibility (Processability)>

A specimen was obtained by applying a slurry composition for a solid electrolyte layer onto one surface of aluminum foil, and then drying the slurry composition to form a solid electrolyte layer. The surface of the specimen at which the solid electrolyte layer was not formed was positioned along a metal rod of 1.0 mm in diameter and was wound around the metal rod. The occurrence of splitting of the solid electrolyte layer was evaluated. An evaluation of "A" was given in a case in which splitting of the solid electrolyte layer did not occur and an evaluation of "B" was given in a case in which splitting of the solid electrolyte layer occurred. The results are shown in Table 1. When splitting of the solid electrolyte layer does not occur, this indicates that the specimen (particularly the solid electrolyte layer) has high flexibility and that processability is excellent.

<Peel Strength>

A slurry for a positive electrode active material layer used in each example or comparative example was applied onto aluminum foil and was dried for 10 minutes at 80° C. to prepare a specimen. The specimen was subjected to a 90° peeling test at a peeling speed of 30 mm/min using tape of 18 mm in width. The maximum value for peel strength after the start of the peeling test was recorded as the peel strength (N/18 mm). The results are shown in Table 1. A value of 5 N/18 mm or more indicates good peel strength, and a larger value for the peel strength indicates better peel strength.

<Measurement of Resistance>

The resistance of a solid electrolyte layer produced in each example or comparative example was determined by measurement using an impedance meter and calculation of resistance ($\Omega$) from a Nyquist plot. The results are shown in Table 1. A smaller value for the resistance indicates that a solid electrolyte battery having better battery performance is obtained.

<Battery Capacity>

A solid electrolyte battery produced in each example or comparative example was subjected to charge/discharge cycling of constant-current charging to 4.2 V and subsequent constant-voltage charging by a 0.5 C constant-current constant-voltage charging method at 25° C., followed by discharging to 3.0 V by a 0.5 C constant current. Five charge/discharge cycles were performed. The discharge capacity of the fifth cycle is shown in Table 1 as the battery capacity (mAh). A larger value indicates better capacity characteristics.

Example 1

<Production of Particulate Polymer>

A glass vessel equipped with a stirrer was charged with 50 parts of n-butyl acrylate as an acrylate monomer, 50 parts of styrene as an aromatic monomer, 1 part of ethylene glycol dimethacrylate (hereinafter also referred to as "EGDMA") as a crosslinking agent, 1 part of sodium dodecylbenzenesulfonate as an emulsifier, 150 parts of deionized water, and 0.5 parts of potassium persulfate as a polymerization initiator. These materials were sufficiently stirred and were then heated to 70° C. to initiate polymerization. Cooling was initiated at the point at which the polymerization conversion rate reached 96% to terminate the reaction and yield a water dispersion of a particulate polymer.

Next, the obtained water dispersion was adjusted to pH 7 using 10 weight % NaOH aqueous solution. The water dispersion of the polymer that had been adjusted to pH 7 was then subjected to heating under reduced pressure to remove unreacted monomer. Thereafter, deionized water was added to adjust the solid content concentration to 30 weight %.

In order to perform solvent exchange of the solvent of the particulate polymer from water to an organic solvent, 500 g of xylene was added as an organic solvent to 100 g of the water dispersion of the particulate polymer that had undergone solid content concentration adjustment, and then water was evaporated under reduced pressure.

<Production of Binder Composition for Solid Electrolyte Battery>

A binder composition for a solid electrolyte battery was produced by adding 100 parts of ethyl cellulose (produced by Wako Pure Chemical Industries, Ltd.; reagent having structure of formula (I); ethoxylation: approximately 49%) to 100 parts of solid content of the particulate polymer that had undergone solvent exchange to xylene.

<Production of Slurry Composition for Positive Electrode Active Material Layer>

A mixture of 100 parts of lithium cobalt oxide (average particle diameter: 11.5 μm) as a positive electrode active material, 150 parts of sulfide glass composed of $Li_2S$ and $P_2S_5$ ($Li_2S/P_2S_5$=70 mol %/30 mol %; number average particle diameter: 0.4 μm) as solid electrolyte particles, 13 parts of acetylene black as a conductive agent, and 2 parts in terms of solid content of the binder composition for a solid electrolyte battery was prepared. The mixture was adjusted to a solid content concentration of 78% through addition of xylene as an organic solvent and was then mixed for 60 minutes using a planetary mixer. The solid content concentration was further adjusted to 74% with xylene, and then 10 minutes of mixing was performed to yield a slurry composition for a positive electrode active material layer.

<Production of Slurry Composition for Negative Electrode Active Material Layer>

A mixture of 100 parts of graphite (average particle diameter: 20 μm) as a negative electrode active material, 50 parts of sulfide glass composed of $Li_2S$ and $P_2S_5$ ($Li_2S/P_2S_5$=70 mol %/30 mol %; number average particle diameter: 0.4 μm) as solid electrolyte particles, and 2 parts in terms of solid content of the binder composition for a solid electrolyte battery was prepared. The mixture was adjusted to solid content concentration of 60% through addition of xylene as an organic solvent and was then mixed using a planetary mixer to yield a slurry composition for a negative electrode active material layer.

<Production of Slurry Composition for Solid Electrolyte Layer>

A mixture of 100 parts of sulfide glass composed of $Li_2S$ and $P_2S_5$ ($Li_2S/P_2S_5$=70 mol %/30 mol %; number average particle diameter: 1.2 μm; D90 particle diameter: 2.1 μm) as solid electrolyte particles and 2 parts in terms of solid content of the binder composition for a solid electrolyte battery was prepared. The mixture was adjusted to a solid content concentration of 30% through addition of xylene as an organic solvent and was then mixed using a planetary mixer to yield a slurry composition for a solid electrolyte layer.

<Production of Solid Electrolyte Battery>

The slurry composition for a positive electrode active material layer was applied onto the surface of a current collector (aluminum foil) and was dried (110° C., 20 minutes) to form a positive electrode active material layer of 50 μm in thickness, and thereby produce a positive electrode. In addition, the slurry composition for a negative electrode active material layer was applied onto the surface of a separate current collector (copper foil) and was dried (110° C., 20 minutes) to form a negative electrode active material layer of 30 μm in thickness, and thereby produce a negative electrode.

Next, the slurry composition for a solid electrolyte layer was applied onto the surface of the positive electrode active material layer and was dried (110° C., 10 minutes) to form a solid electrolyte layer of 18 μm in thickness, and thereby obtain a solid electrolyte layer-equipped positive electrode for a solid electrolyte battery.

The solid electrolyte layer of the solid electrolyte layer-equipped positive electrode for a solid electrolyte battery and the negative electrode active material layer of the negative electrode were laminated, and then pressing was performed to obtain a solid electrolyte battery. The thickness of the solid electrolyte layer in the post-pressing solid electrolyte battery was 11 μm.

Example 2

A particulate polymer was produced in the same way as in Example 1 with the exception that monomer used in production of the particulate polymer was changed to 70 parts of 2-ethylhexyl acrylate as an acrylate monomer and 30 parts of styrene as an aromatic monomer, and the amount of EGDMA used as a crosslinking agent was changed to 2 parts. Production of a binder composition for a solid electrolyte battery and production of a solid electrolyte battery were carried out in the same way as in Example 1 with the exception that this particulate polymer was used.

Example 3

A particulate polymer was produced in the same way as in Example 1 with the exception that monomer used in production of the particulate polymer was changed to 50 parts of n-butyl acrylate and 25 parts of ethyl acrylate as acrylate monomers and 25 parts of styrene as an aromatic monomer, and the amount of EGDMA used as a crosslinking agent was changed to 2 parts. Moreover, when this particulate polymer was used in production of a binder composition for a solid electrolyte battery, the added amount of ethyl cellulose was changed to 50 parts of ethyl cellulose per 100 parts of solid content of the particulate polymer. Production of a solid electrolyte battery was carried out in the same way as in Example 1 with the exception that this binder composition for a solid electrolyte battery was used.

Example 4

A particulate polymer was produced in the same way as in Example 1 with the exception that monomer used in production of the particulate polymer was changed to 50 parts of 2-ethylhexyl acrylate as an acrylate monomer and 50 parts of styrene as an aromatic monomer, and the amount of EGDMA used as a crosslinking agent was changed to 2 parts. Moreover, when this particulate polymer was used in production of a binder composition for a solid electrolyte battery, the added amount of ethyl cellulose was changed to 500 parts of ethyl cellulose per 100 parts of solid content of the particulate polymer. Production of a solid electrolyte battery was carried out in the same way as in Example 1 with the exception that this binder composition for a solid electrolyte battery was used.

Comparative Example 1

In production of a binder composition for a solid electrolyte battery, 100 parts of sodium carboxymethyl cellulose (produced by Wako Pure Chemical Industries, Ltd.; reagent) per 100 parts of solid content of the particulate polymer was added instead of ethyl cellulose. Production of a solid electrolyte battery was attempted in the same way as in Example 1 using this binder composition for a solid electrolyte battery. However, it was not possible to obtain a solid electrolyte battery due to poor flexibility of the solid electrolyte layer.

Comparative Example 2

A particulate polymer was produced in the same way as in Example 1 with the exception that monomer used in production of the particulate polymer was changed to 50 parts of n-butyl acrylate and 50 parts of ethyl acrylate as acrylate monomers, and the amount of EGDMA used as a crosslinking agent was changed to 2 parts. Production of a binder composition for a solid electrolyte battery and production of a solid electrolyte battery were carried out in the same way as in Example 1 with the exception that this particulate polymer was used.

Comparative Example 3

A particulate polymer was produced in the same way as in Example 1 with the exception that monomer used in production of the particulate polymer was changed to 100 parts of styrene as an aromatic monomer. Production of a binder composition for a solid electrolyte battery and production of a solid electrolyte battery were attempted in the same way as in Example 1 with the exception that this particulate polymer was used. However, it was not possible to obtain a solid electrolyte battery due to poor flexibility of the solid electrolyte layer.

TABLE 1

|  |  |  |  | Example 1 | Example 2 | Example 3 | Example 4 |
|---|---|---|---|---|---|---|---|
| Binder composition for solid electrolyte battery | Particulate polymer | Acrylate monomer | n-Butyl acrylate (weight %) | 50 | — | 50 | — |
|  |  |  | Ethyl acrylate (weight %) | — | — | 25 | — |
|  |  |  | 2-Ethylhexyl acrylate (weight %) | — | 70 | — | 50 |
|  |  | Aromatic monomer | Styrene (weight %) | 50 | 30 | 25 | 50 |
|  |  | Crosslinking agent | EGDMA (parts by weight per 100 parts of monomer) | 1 | 2 | 2 | 2 |
|  | Alkyl-modified cellulose | Ethyl cellulose | Amount per 100 parts of particulate polymer (parts by weight) | 100 | 100 | 50 | 500 |
|  | — | Carboxymethyl cellulose | Amount per 100 parts of particulate polymer (parts by weight) | — | — | — | — |
| Evaluations |  | Flexibility [processability] (—) |  | A | A | A | A |
|  |  | Peel strength (N/18 mm) |  | 8.8 | 7.8 | 7.6 | 9.5 |
|  |  | Resistance (Ω) |  | 5.4 | 5.8 | 6.4 | 7.2 |
|  |  | Battery capacity (mAh) |  | 13 | 15 | 10 | 10 |

|  |  |  |  | Comparative Example 1 | Comparative Example 2 | Comparative Example 3 |
|---|---|---|---|---|---|---|
| Binder composition for solid electrolyte battery | Particulate polymer | Acrylate monomer | n-Butyl acrylate (weight %) | 50 | 50 | — |
|  |  |  | Ethyl acrylate (weight %) | — | 50 | — |
|  |  |  | 2-Ethylhexyl acrylate (weight %) | — | — | — |
|  |  | Aromatic monomer | Styrene (weight %) | 50 | — | 100 |
|  |  | Crosslinking agent | EGDMA (parts by weight per 100 parts of monomer) | 1 | 2 | 1 |
|  | Alkyl-modified cellulose | Ethyl cellulose | Amount per 100 parts of particulate polymer (parts by weight) | — | 100 | 100 |
|  | — | Carboxymethyl cellulose | Amount per 100 parts of particulate polymer (parts by weight) | 100 | — | — |
| Evaluations |  | Flexibility [processability] (—) |  | B | A | B |
|  |  | Peel strength (N/18 mm) |  | 10.2 | 2.2 | 10.5 |
|  |  | Resistance (Ω) |  | 45 | 22 | 33 |
|  |  | Battery capacity (mAh) |  | — | 3.5 | — |

It can be seen from Table 1 that in Examples 1 to 4 in which a binder composition for a solid electrolyte battery was used that contained a particulate polymer of a copolymer including an acrylate monomer unit and an aromatic monomer unit, alkyl-modified cellulose represented by formula (I), and an organic solvent, layers having excellent flexibility (processability) and peel strength were obtained. Moreover, in Examples 1 to 4, resistance was low, and when a solid electrolyte battery was produced and subjected to five cycles of charging and discharging, battery capacity was good. Therefore, it was possible to ensure that battery characteristics of a solid electrolyte battery were excellent.

INDUSTRIAL APPLICABILITY

According to the present disclosure, it is possible to provide a binder composition for a solid electrolyte battery and a slurry composition for a solid electrolyte battery that have excellent processability and can cause a solid electrolyte battery to display excellent battery characteristics.

The invention claimed is:

1. A binder composition for a solid electrolyte battery comprising:
    a particulate polymer of a copolymer including an acrylate monomer unit and an aromatic monomer unit;
    alkyl-modified cellulose represented by formula (I), shown below,

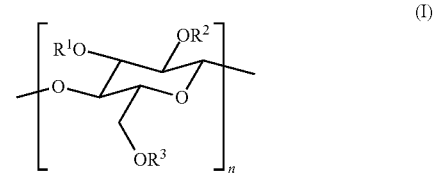

(I)

where $R^1$, $R^2$, and $R^3$ each indicate a hydrogen atom or an alkyl group having a carbon number of at least 1 and not more than 4, at least two of $R^1$, $R^2$, and $R^3$ are alkyl groups having a carbon number of at least 2 and not more than 4 in 50 mol % or more of all repeating units, and n indicates a natural number; and an organic solvent, wherein the acrylate monomer unit and the aromatic monomer unit are included in the particulate polymer in a weight ratio of 40:60 to 75:25, the organic solvent is xylene, the alkyl-modified cellulose is ethyl cellulose, and the amount of the ethyl cellulose per 100 parts by weight of the particulate polymer is at least 70 parts by weight and not more than 500 parts by weight.

2. The binder composition for a solid electrolyte battery according to claim 1, wherein the ethyl cellulose has a degree of substitution of at least 2.2 and not more than 2.7.

3. A slurry composition for a solid electrolyte battery comprising:

the binder composition for a solid electrolyte battery according to claim 1; and solid electrolyte particles.

4. The slurry composition for a solid electrolyte battery according to claim 3, wherein the solid electrolyte particles are solid electrolyte particles formed from a sulfide.

\* \* \* \* \*